(12) United States Patent
Lim et al.

(10) Patent No.: US 11,209,704 B2
(45) Date of Patent: Dec. 28, 2021

(54) LIQUID CRYSTAL DISPLAY DEVICE AND METHOD OF FABRICATING THE SAME

(71) Applicant: LG Display Co., Ltd., Seoul (KR)

(72) Inventors: Gi-Hwan Lim, Paju-si (KR); Min-Geun Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/167,671

(22) Filed: Feb. 4, 2021

(65) Prior Publication Data

US 2021/0157182 A1 May 27, 2021

Related U.S. Application Data

(62) Division of application No. 16/688,591, filed on Nov. 19, 2019, now Pat. No. 10,942,401.

(30) Foreign Application Priority Data

Dec. 4, 2018 (KR) .......................... 10-2018-0154638

(51) Int. Cl.
| | | |
|---|---|---|
| *G02F 1/1347* | (2006.01) | |
| *G02F 1/153* | (2006.01) | |
| *G02F 1/1337* | (2006.01) | |
| *G02F 1/1368* | (2006.01) | |

(52) U.S. Cl.
CPC ...... *G02F 1/1347* (2013.01); *G02F 1/133711* (2013.01); *G02F 1/153* (2013.01); *G02F 1/1368* (2013.01); *G02F 1/13478* (2021.01); *G02F 1/133715* (2021.01); *G02F 2201/44* (2013.01); *G02F 2203/02* (2013.01); *G02F 2203/34* (2013.01)

(58) Field of Classification Search
CPC .................................................... G02F 1/1347
See application file for complete search history.

(56) References Cited

U.S. PATENT DOCUMENTS

| | | |
|---|---|---|
| 2011/0069262 A1 | 3/2011 | Kim et al. |
| 2012/0274887 A1 | 11/2012 | Hwang et al. |
| 2018/0364504 A1 | 12/2018 | Bae et al. |

FOREIGN PATENT DOCUMENTS

KR    10-2007-0058149 A    6/2007

*Primary Examiner* — Edmond C Lau
(74) *Attorney, Agent, or Firm* — Fenwick & West LLP

(57) ABSTRACT

A reflective liquid crystal display device includes: first to fourth substrates spaced apart from and parallel to each other; a first stack including a first pixel electrode, a first alignment layer, a first common electrode, a second alignment layer and a first cholesteric liquid crystal layer between the first and second alignment layers; a second stack including a second pixel electrode, a third alignment layer, a second common electrode, a fourth alignment layer and a second cholesteric liquid crystal layer between the third and fourth alignment layers; a third stack including a third pixel electrode, a fifth alignment layer, a third common electrode, a sixth alignment layer and a third cholesteric liquid crystal layer between the fifth and sixth alignment layers; and a fourth stack including a first mode electrode, an ion storing layer, an electrolyte layer, an electrochromic layer and a second mode electrode sequentially on the first substrate.

7 Claims, 10 Drawing Sheets

LIQUID CRYSTAL DISPLAY DEVICE AND METHOD OF FABRICATING THE SAME

CROSS REFERENCE TO RELATED APPLICATIONS

The present application is a divisional of U.S. patent application Ser. No. 16/688,591 filed on Nov. 19, 2019 which claims the priority benefit of Republic of Korea Patent Application No. 10-2018-0154638 filed in Republic of Korea on Dec. 4, 2018, each of which is hereby incorporated by reference in its entirety for all purposes as if fully set forth herein.

BACKGROUND

Field of Technology

The present disclosure relates to a liquid crystal display device, and more particularly, to a reflective liquid crystal display device including a cholesteric liquid crystal layer and an alignment layer due to a self-alignment monomer and a method of fabricating the reflective liquid crystal display device.

Discussion of the Related Art

Recently, as the information age rapidly progresses, display devices processing and displaying a large amount of information have advanced. For example, various flat panel displays (FPDs) having a thin profile, a light weight and a low power consumption have been researched.

As a result, a thin film transistor liquid crystal display (TFT-LCD) having an excellent color reproducibility and a thin profile has been developed. The LCD device displays an image using an optical anisotropy and a polarization property of a liquid crystal molecule.

Specifically, display devices using a cholesteric liquid crystal (CLC) have been developed. For example, a reflective liquid crystal display (LCD) device where an image is displayed using three cholesteric liquid crystal layers selectively reflecting red, green and blue colored lights without an additional backlight unit has been suggested.

In the stack type reflective LCD device, three stacks each including two substrates having alignment layers on inner surfaces thereof and a cholesteric liquid crystal (CLC) layer are laminated. The three stacks selectively reflect red, green, and blue colored lights, respectively, to display an image.

First and second alignment layers may be formed on first and second substrates, respectively, and a first cholesteric liquid crystal layer for selective reflection of a red colored light may be formed between the first and second alignment layers, thereby a first stack completed. Third and fourth alignment layers may be formed on third and fourth substrates, respectively, and a second cholesteric liquid crystal layer for selective reflection of a green colored light may be formed between the third and fourth alignment layers, thereby a second stack completed. Fifth and sixth alignment layers may be formed on fifth and sixth substrates, respectively, and a third cholesteric liquid crystal layer for selective reflection of a blue colored light may be formed between the fifth and sixth alignment layers, thereby a third stack completed. Next, a stack type reflective LCD device may be completed by attaching the first, second and third stacks.

In the stack type reflective LCD device, since six substrates are used and six alignment layers are formed, material cost increases and a number of fabrication steps such as a rubbing increases. As a result, a fabrication time and a fabrication cost increase.

In addition, since six alignment layers are individually formed and then attached, optical axes of three cholesteric liquid crystal layers are misaligned with each other. As a result, a contrast ratio and a color purity are reduced.

Further, a twist angle occurs due to an error of alignment directions generated in an attachment step of three stacks. When a reactive mesogen is used to remedy the above drawback, a driving voltage increases.

Moreover, since each of six alignment layers has a thickness of about 100 nm, a transmittance is reduced due to six alignment layers having a total thickness of about 600 nm. When thicknesses of six alignment layers are reduced to prevent reduction of a transmittance, a defect occurs due to decrease of an anchoring energy or a stain occurs due to injection or dispensing of a cholesteric liquid crystal.

SUMMARY

Accordingly, the present disclosure is directed to a liquid crystal display device that substantially obviates one or more of the problems due to limitations and disadvantages of the related art.

An object of the present disclosure is to provide a reflective liquid crystal display device and a method of fabricating the same where a fabrication process is simplified and a fabrication cost is reduced by forming an alignment layer through a single irradiation of an ultraviolet ray after a cholesteric liquid crystal layer is formed.

Another object of the present disclosure is to provide a reflective liquid crystal display device and a method of fabricating the same where a misalignment of optical axes is reduced and a contrast ratio and a color purity are improved by forming an alignment layer through a single irradiation of an ultraviolet ray after a cholesteric liquid crystal layer is formed.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present disclosure, as embodied and broadly described herein, a reflective liquid crystal display device includes: first, second, third and fourth substrates spaced apart from and parallel to each other, each of the first, second, third and fourth substrates including a plurality of pixels; a first stack including a first pixel electrode in each of the plurality of pixels on an upper surface of the first substrate, a first alignment layer on an entire surface including the first pixel electrode, a first common electrode on an entire lower surface of the second substrate, a second alignment layer on an entire surface including the first common electrode and a first cholesteric liquid crystal layer between the first and second alignment layers; a second stack including a second pixel electrode in each of the plurality of pixels on an upper surface of the second substrate, a third alignment layer on an entire surface including the second pixel electrode, a second common electrode on an entire lower surface of the third substrate, a fourth alignment layer on an entire surface including the second common electrode and a second cholesteric liquid crystal layer between the third and fourth alignment layers; a third stack including a third pixel electrode in each of the plurality of pixels on an upper surface of the third substrate, a fifth alignment layer on an entire surface including the third pixel electrode, a third common electrode on an entire lower surface of the fourth substrate, a sixth alignment layer on an entire surface including the third common electrode and a third cholesteric liquid crystal layer between the fifth and sixth alignment layers; and a fourth stack including a first mode electrode, an ion storing layer, an electrolyte layer, an electrochromic layer and a second mode electrode sequentially on an entire lower surface of the first substrate.

In another aspect, a method of fabricating a reflective liquid crystal display device includes: forming a first mode electrode, an ion storing layer, an electrolyte layer, an electrochromic layer and a second mode electrode sequentially on an entire lower surface of a first substrate; forming a first pixel electrode in each of a plurality of pixels on an upper surface of the first substrate; forming a first common electrode on an entire lower surface of a second substrate; forming a second pixel electrode in each of the plurality of pixels on an upper surface of the second substrate; forming a first cholesteric liquid crystal layer between the first and second substrates with a mixed material of a first cholesteric liquid crystal molecule and a self-alignment monomer; forming a second common electrode on an entire lower surface of a third substrate; forming a third pixel electrode in each of the plurality of pixels on an upper surface of the third substrate; forming a second cholesteric liquid crystal layer between the second and third substrates with a mixed material of a second cholesteric liquid crystal molecule and the self-alignment monomer; forming a third common electrode on an entire lower surface of a fourth substrate; forming a third cholesteric liquid crystal layer between the third and fourth substrates with a mixed material of a third cholesteric liquid crystal molecule and the self-alignment monomer; and forming a first alignment layer between the first substrate and the first cholesteric liquid crystal layer, a second alignment layer between the second substrate and the first cholesteric liquid crystal layer, a third alignment layer between the second substrate and the second cholesteric liquid crystal layer, a fourth alignment layer between the third substrate and the second cholesteric liquid crystal layer, a fifth alignment layer between the third substrate and the third cholesteric liquid crystal layer and a sixth alignment layer between the fourth substrate and the third cholesteric liquid crystal layer by irradiating a polarized ultraviolet ray onto the first, second and third cholesteric liquid crystal layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
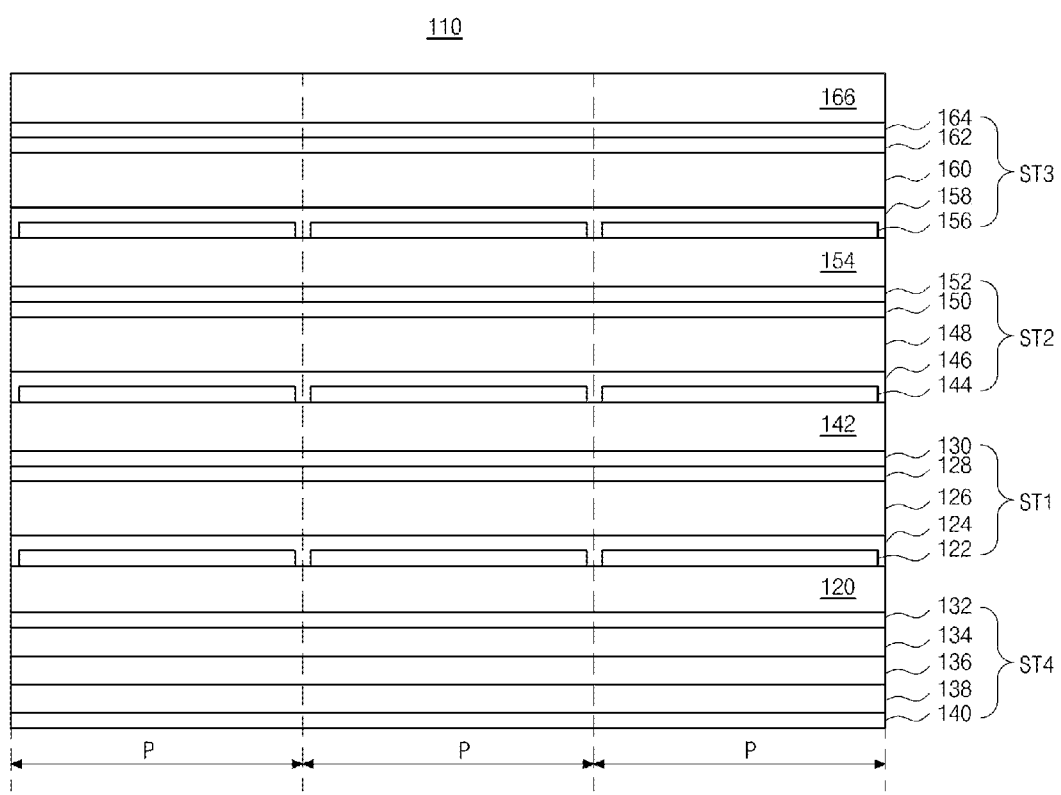
FIG. 1 is a cross-sectional view showing a reflective liquid crystal display device according to an embodiment of the present disclosure.

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Reference will now be made in detail to the present disclosure, examples of which are illustrated in the accompanying drawings.

FIG. 1 is a cross-sectional view showing a reflective liquid crystal display device according to an embodiment of the present disclosure.

In FIG. 1, a reflective liquid crystal display device 110 according to an embodiment of the present disclosure includes first stack ST1, second stack ST2, and third stack ST3 selectively reflecting red, green and blue colored lights, respectively, and a fourth stack ST4 determining an opaque mode or a transparent mode by absorbing or transmitting a light.

The first stack ST1 includes a first cholesteric liquid crystal (CLC) layer 126 between first and second substrates 120 and 142 facing and spaced apart from each other, the second stack ST2 includes a second CLC layer 148 between second and third substrates 142 and 154 facing and spaced apart from each other, and the third stack ST3 includes a third CLC layer 160 between third and fourth substrates 154 and 166 facing and spaced apart from each other.

The fourth stack ST4 includes an electrochromic layer 138 under the first substrate 120.

The first, second, third and fourth substrates 120, 142, 154 and 166 are spaced apart from and are parallel to one another. Each of the first, second, third and fourth substrates 120, 142, 154 and 166 includes a plurality of pixels P.

A first mode electrode 132, an ion storing layer 134, an electrolyte layer 136, the electrochromic layer 138, and a second mode electrode 140 are sequentially disposed on of the entire first surface (a lower surface) of the first substrate 120.

The first and second mode electrodes 132 and 140 supply a charge such as a hole and an electron to the electrochromic layer 138 due to application of a voltage. The first and second mode electrodes 132 and 140 may be formed of a transparent conductive material such as indium tin oxide (ITO) and indium zinc oxide (IZO).

The ion storing layer 134 reinforces a transmission force of the charge such as a hole and an electron. The ion storing layer 134 may be formed of an inorganic material having a relatively high ion conductivity such as tin oxide (TO) doped with antimony (Sb).

The electrolyte layer 136 transmits the charge such as a hole and an electron of the first and second mode electrodes 132 and 140 to the electrochromic layer 138 due to application of a voltage. The electrolyte layer 136 may be formed of an electrolyte of a liquid phase, a quasi-solid phase or a solid phase.

The electrochromic layer 138 is oxidized or reduced due to the charge such as a hole and an electron to be colorized (opaque) or decolorized (transparent). As a result, the electrochromic layer 138 absorbs or transmits a light. The electrochromic layer 138 may be formed of a transition metal oxide such as tungsten oxide ($WO_3$), molybdenum oxide ($MoO_3$) and titanium oxide ($TiO_2$) colorized due to a reduction and lithium nickel oxide (LiNiOx), vanadium oxide ($V_2O_5$) and iron oxide ($IrO_2$) colorized due to an oxidation.

The first mode electrode 132, the ion storing layer 134, the electrolyte layer 136, the electrochromic layer 138 and the second mode electrode 140 under the first substrate 120 constitute the fourth stack ST4.

A first pixel electrode 122 is disposed in each pixel P on a second surface (an upper surface) of the first substrate 120, and a first alignment layer 124 is disposed on an entire surface including the first pixel electrode 122 of the first substrate 120.

A gate line, a data line and a thin film transistor (TFT) may be disposed between the first substrate 120 and the first pixel electrode 122.

A first common electrode 130 is disposed on an entire first surface (a lower surface) of the second substrate 142, and a second alignment layer 128 is disposed on an entire surface including the first common electrode 130 of the second substrate 142.

The first CLC layer 126 is disposed between the first and second alignment layers 124 and 128. The first and second alignment layers 124 and 128 initially align the first CLC layer 126. The first CLC layer 126 reflects a red colored light of a predetermined circularly polarized component (a left-handed circularly polarized component or a right-handed circularly polarized component) among an incident external light according to a voltage applied to the first pixel electrode 122 and the first common electrode 130 and transmits a light of the other components.

The first pixel electrode 122, the first alignment layer 124, the first CLC layer 126, the second alignment layer 128 and the first common electrode 130 between the first and second substrates 120 and 142 constitute the first stack ST1.

A second pixel electrode 144 is disposed in each pixel P on a second surface (an upper surface) of the second substrate 142, and a third alignment layer 146 is disposed on an entire surface including the second pixel electrode 144 of the second substrate 142.

A gate line, a data line and a thin film transistor (TFT) may be disposed between the second substrate 142 and the second pixel electrode 144.

A second common electrode 152 is disposed on an entire first surface (a lower surface) of the third substrate 154, and a fourth alignment layer 150 is disposed on an entire surface including the second common electrode 152 of the third substrate 154.

The second CLC layer 148 is disposed between the third and fourth alignment layers 146 and 150. The third and fourth alignment layers 146 and 150 initially align the second CLC layer 148. The second CLC layer 148 reflects a green colored light of a predetermined circularly polarized component (a left-handed circularly polarized component or a right-handed circularly polarized component) among an incident external light according to a voltage applied to the second pixel electrode 144 and the second common electrode 152 and transmits a light of the other components.

The second pixel electrode 144, the third alignment layer 146, the second CLC layer 148, the fourth alignment layer 150 and the second common electrode 152 between the second and third substrates 142 and 154 constitute the second stack ST2.

A third pixel electrode 156 is disposed in each pixel P on a second surface (an upper surface) of the third substrate 154, and a fifth alignment layer 158 is disposed on an entire surface including the third pixel electrode 156 of the third substrate 154.

A gate line, a data line and a thin film transistor (TFT) may be disposed between the third substrate 154 and the third pixel electrode 156.

A third common electrode 164 is disposed on an entire first surface (a lower surface) of the fourth substrate 166, and a sixth alignment layer 162 is disposed on an entire surface including the third common electrode 164 of the fourth substrate 166.

The third CLC layer 160 is disposed between the fifth and sixth alignment layers 158 and 162. The fifth and sixth alignment layers 158 and 162 initially align the third CLC layer 160. The third CLC layer 160 reflects a blue colored light of a predetermined circularly polarized component (a left-handed circularly polarized component or a right-handed circularly polarized component) among an incident external light according to a voltage applied to the third pixel electrode 156 and the third common electrode 164 and transmits a light of the other components.

The third pixel electrode 156, the fifth alignment layer 158, the third CLC layer 160, the sixth alignment layer 162 and the third common electrode 164 between the third and fourth substrates 154 and 166 constitute the third stack ST3.

Each of the first, second and third CLC layers 126, 148 and 160 includes a nematic liquid crystal and a chiral dopant to have a spiral structure where a director of the nematic liquid crystal rotates along a spiral axis due to the chiral dopant and a layer of a pitch is repeated.

The first, second, third and fourth substrates 120, 142, 154 and 166 may be formed of a glass or a flexible material such as a plastic.

In the reflective LCD device 110 according to an embodiment of the present disclosure, since the first, second and third stacks selectively reflecting the red, green and blue colored lights are formed by using the first, second, third and fourth substrates 120, 142, 154 and 166, a volume and a weight decrease and a fabrication cost is reduced.

The reflective LCD device 110 displays an image by using the red, green and blue colored lights reflected by the first, second and third stacks ST1, ST2 and ST3. These features will be illustrated with reference to drawings.

Figure 2A:
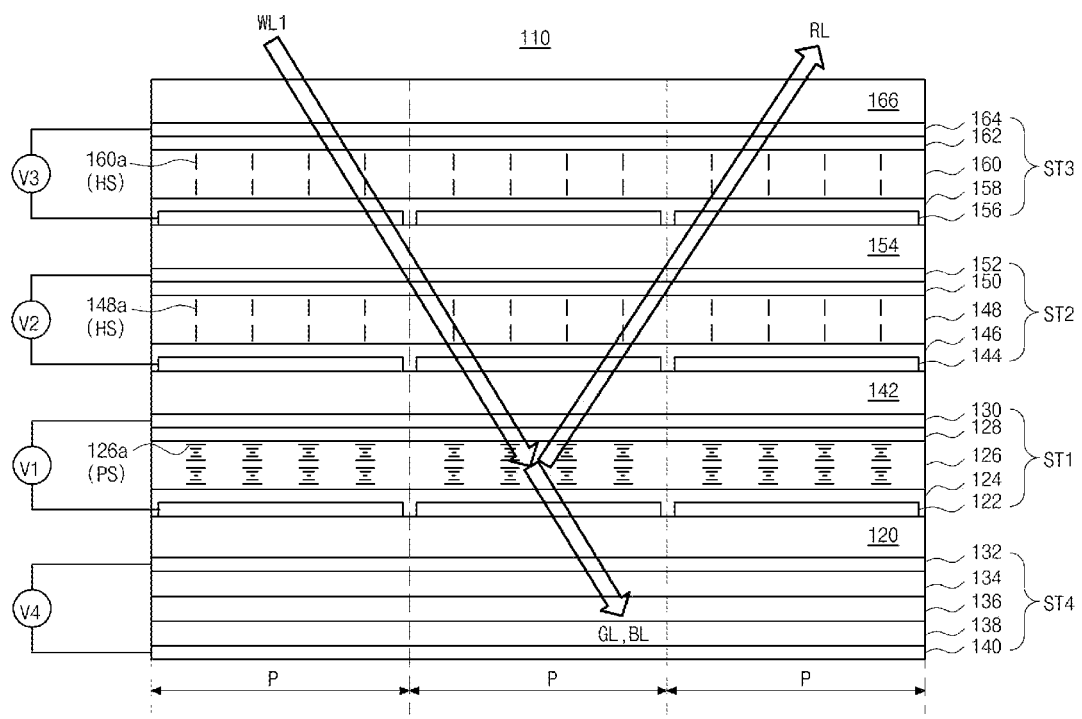
FIG. 2A is a cross-sectional view showing reflection of a red colored light of a reflective liquid crystal display device according to an embodiment of the present disclosure.
Figure 2B:
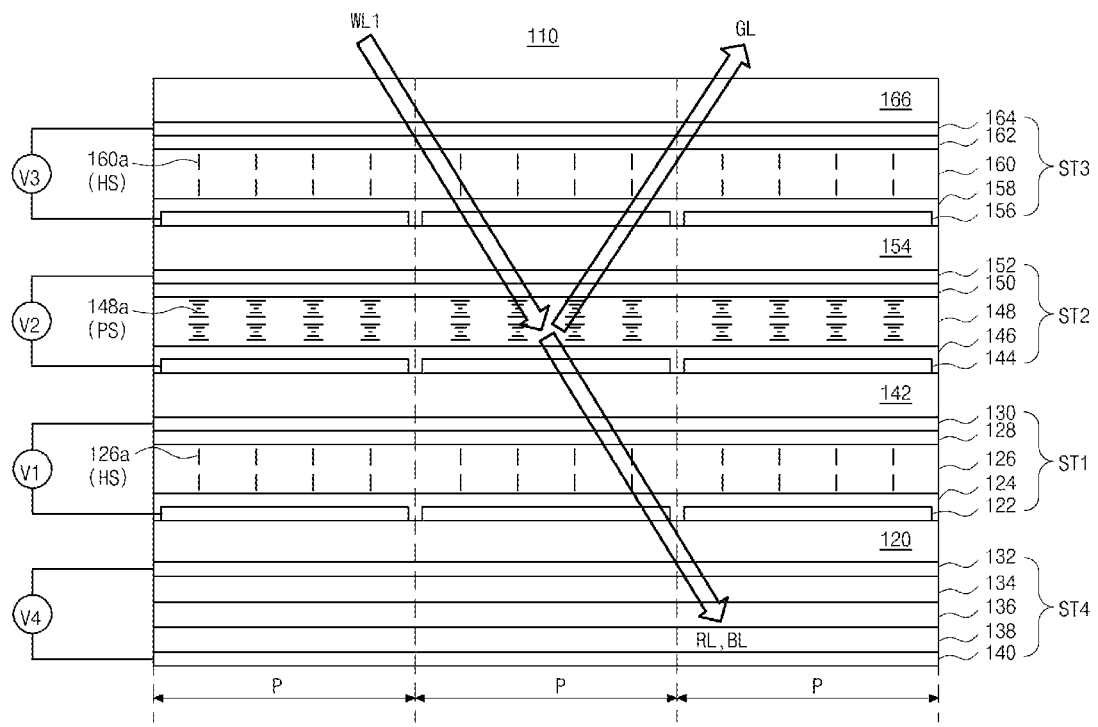
FIG. 2B is a cross-sectional view showing reflection of a green colored light of a reflective liquid crystal display device according to an embodiment of the present disclosure.
Figure 2C:
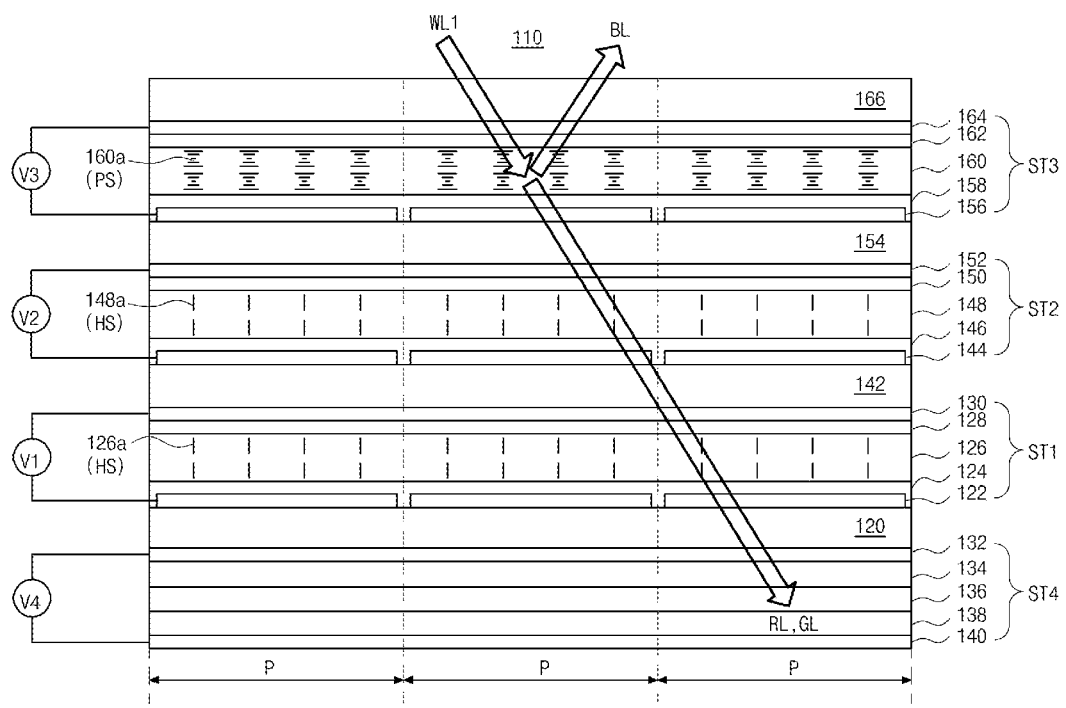
FIG. 2C is a cross-sectional view showing reflection of a blue colored light of a reflective liquid crystal display device according to an embodiment of the present disclosure.

FIGS. 2A, 2B and 2C are cross-sectional views showing reflection of red, green and blue colored lights, respectively, of a reflective liquid crystal display device according to an embodiment of the present disclosure.

In FIGS. 2A, 2B and 2C, first, second and third voltages V1, V2 and V3 are applied to the first, second and third stacks ST1, ST2 and ST3, respectively, of the reflective LCD device 110 according to an embodiment of the present disclosure, thereby states of the first, second and third CLC layers 126, 148 and 160 adjusted. A fourth voltage V4 is applied to the fourth stack ST4, thereby a state of the electrochromic layer 138 adjusted.

In FIG. 2A, in order for the reflective LCD device 110 to reflect the red colored light RL and not reflect the green and blue colored lights GL and BL among a first white colored light WL1 incident from an exterior, the first voltage V1 is applied between the first pixel electrode 122 and the first common electrode 130 of the first stack ST1, and a first CLC molecule 126a of the first CLC layer 126 has a planar state PS where a rotation surface of a director is disposed parallel to surfaces of the first and second substrates 120 and 142.

The first CLC layer 126 of the planar state PS reflects the red colored light RL of a predetermined circularly polarized component (a left-handed circularly polarized component or a right-handed circularly polarized component) and transmits a light of the other components. A reflectance of the red colored light RL may be adjusted by changing a magnitude of the first voltage V1.

For example, the first voltage V1 may be equal to or greater than 0 V and equal to or smaller than a maximum reflection voltage Vmr. The first CLC layer 126 may display the red colored light RL of a maximum gray level when the first voltage V1 is 0 V, and the first CLC layer 126 may display the red colored light RL of a minimum gray level when the first voltage V1 is the maximum reflection voltage Vmr. When the first voltage V1 is between 0 V and the maximum reflection voltage Vmr, the first CLC layer 126 may display the red colored light RL of a gray level between the maximum gray level and the minimum gray level.

The second voltage V2 is applied between the second pixel electrode 144 and the second common electrode 152 of the second stack ST2, and a second CLC molecule 148a of the second CLC layer 148 has a homeotropic state HS where a rotation surface of a director is disposed perpendicular to surfaces of the second and third substrates 142 and 154.

The second CLC layer 148 of the homeotropic state HS transmits the red, green and blue colored light RL, GL and BL of all of circularly polarized components (a left-handed circularly polarized component and a right-handed circularly polarized component).

For example, the second voltage V2 may be equal to or greater than a minimum transmission voltage Vmt. The minimum transmission voltage Vmt may be greater than the maximum reflection voltage Vmr.

The third voltage V3 is applied between the third pixel electrode 156 and the third common electrode 164 of the third stack ST3, and a third CLC molecule 160a of the third CLC layer 160 has a homeotropic state HS where a rotation surface of a director is disposed perpendicular to surfaces of the third and fourth substrates 154 and 166.

The third CLC layer 160 of the homeotropic state HS transmits the red, green and blue colored light RL, GL and BL of all of circularly polarized components (a left-handed circularly polarized component and a right-handed circularly polarized component).

For example, the third voltage V3 may be equal to or greater than a minimum transmission voltage Vmt. The minimum transmission voltage Vmt may be greater than the maximum reflection voltage Vmr.

The fourth voltage V4 is applied to between the first and second mode electrodes 132 and 140 of the fourth stack ST4, and the electrochromic layer 138 is oxidized or reduced according to an opaque mode or a transparent mode to be colorized or decolorized.

As a result, the red, green and blue colored lights RL, GL and BL of all of circularly polarized components (a left-handed circularly polarized component and a right-handed circularly polarized component) among the first white colored light WL1 incident from an exterior intactly pass through the third and second CLC layers 160 and 148 of the homeotropic state HS. The red colored light RL of a predetermined circularly polarized component (a left-handed circularly polarized component or a right-handed circularly polarized component) among the first white colored light WL1 incident from an exterior is reflected by the first CLC layer 126 of the planar state PS, and the light of the other components intactly passes through the first CLC layer 126 of the planar state PS. Accordingly, the reflective LCD device 110 emits the red colored light RL to display a gray level corresponding to a red color.

In FIG. 2B, in order for the reflective LCD device 110 to reflect the green colored light GL and not reflect the red and blue colored lights RL and BL among a first white colored light WL1 incident from an exterior, the second voltage V2 is applied between the second pixel electrode 144 and the second common electrode 152 of the second stack ST2, and a second CLC molecule 148a of the second CLC layer 148 has a planar state PS where a rotation surface of a director is disposed parallel to surfaces of the second and third substrates 142 and 154.

The second CLC layer 148 of the planar state PS reflects the green colored light GL of a predetermined circularly polarized component (a left-handed circularly polarized component or a right-handed circularly polarized component) and transmits a light of the other components. A reflectance of the green colored light GL may be adjusted by changing a magnitude of the second voltage V2.

For example, the second voltage V2 may be equal to or greater than 0 V and equal to or smaller than a maximum reflection voltage Vmr. The second CLC layer 148 may display the green colored light GL of a maximum gray level when the second voltage V2 is 0 V, and the second CLC layer 148 may display the green colored light GL of a minimum gray level when the second voltage V2 is the maximum reflection voltage Vmr. When the second voltage V2 is between 0 V and the maximum reflection voltage Vmr, the second CLC layer 148 may display the green colored light GL of a gray level between the maximum gray level and the minimum gray level.

The first voltage V1 is applied between the first pixel electrode 122 and the first common electrode 130 of the first stack ST1, and a first CLC molecule 126a of the first CLC layer 126 has a homeotropic state HS where a rotation surface of a director is disposed perpendicular to surfaces of the first and second substrates 120 and 142.

The first CLC layer 126 of the homeotropic state HS transmits the red, green and blue colored light RL, GL and BL of all of circularly polarized components (a left-handed circularly polarized component and a right-handed circularly polarized component).

For example, the first voltage V1 may be equal to or greater than a minimum transmission voltage Vmt. The minimum transmission voltage Vmt may be greater than the maximum reflection voltage Vmr.

The third voltage V3 is applied between the third pixel electrode 156 and the third common electrode 164 of the third stack ST3, and a third CLC molecule 160a of the third CLC layer 160 has a homeotropic state HS where a rotation surface of a director is disposed perpendicular to surfaces of the third and fourth substrates 154 and 166.

The third CLC layer 160 of the homeotropic state HS transmits the red, green and blue colored light RL, GL and BL of all of circularly polarized components (a left-handed circularly polarized component and a right-handed circularly polarized component).

For example, the third voltage V3 may be equal to or greater than a minimum transmission voltage Vmt. The minimum transmission voltage Vmt may be greater than the maximum reflection voltage Vmr.

The fourth voltage V4 is applied to between the first and second mode electrodes 132 and 140 of the fourth stack ST4, and the electrochromic layer 138 is oxidized or reduced according to an opaque mode or a transparent mode to be colorized or decolorized.

As a result, the red, green and blue colored lights RL, GL and BL of all of circularly polarized components (a left-handed circularly polarized component and a right-handed circularly polarized component) among the first white colored light WL1 incident from an exterior intactly pass through the third CLC layer 160 of the homeotropic state HS. The green colored light GL of a predetermined circularly polarized component (a left-handed circularly polarized component or a right-handed circularly polarized component) among the first white colored light WL1 incident from an exterior is reflected by the second CLC layer 148 of the planar state PS, and the light of the other components including the red and blue colored lights RL and BL intactly passes through the second CLC layer 148 of the planar state PS and the first CLC layer 126 of the planar state PS. Accordingly, the reflective LCD device 110 emits the green colored light GL to display a gray level corresponding to a green color.

In FIG. 2C, in order for the reflective LCD device 110 to reflect the blue colored light BL and not reflect the red and green colored lights RL and GL among a first white colored light WL1 incident from an exterior, the third voltage V3 is applied between the third pixel electrode 156 and the third common electrode 164 of the third stack ST3, and a third CLC molecule 160a of the third CLC layer 160 has a planar state PS where a rotation surface of a director is disposed parallel to surfaces of the third and fourth substrates 154 and 166.

The third CLC layer 160 of the planar state PS reflects the blue colored light BL of a predetermined circularly polarized component (a left-handed circularly polarized component or a right-handed circularly polarized component) and transmits a light of the other components. A reflectance of the blue colored light BL may be adjusted by changing a magnitude of the third voltage V3.

For example, the third voltage V3 may be equal to or greater than 0 V and equal to or smaller than a maximum reflection voltage Vmr. The third CLC layer 160 may display the blue colored light BL of a maximum gray level when the third voltage V3 is 0 V, and the third CLC layer 160 may display the blue colored light BL of a minimum gray level when the third voltage V3 is the maximum reflection voltage Vmr. When the third voltage V3 is between 0 V and the maximum reflection voltage Vmr, the third CLC layer 160 may display the blue colored light BL of a gray level between the maximum gray level and the minimum gray level.

The first voltage V1 is applied between the first pixel electrode 122 and the first common electrode 130 of the first stack ST1, and a first CLC molecule 126a of the first CLC layer 126 has a homeotropic state HS where a rotation surface of a director is disposed perpendicular to surfaces of the first and second substrates 120 and 142.

The first CLC layer 126 of the homeotropic state HS transmits the red, green and blue colored light RL, GL and BL of all of circularly polarized components (a left-handed circularly polarized component and a right-handed circularly polarized component).

For example, the first voltage V1 may be equal to or greater than a minimum transmission voltage Vmt. The minimum transmission voltage Vmt may be greater than the maximum reflection voltage Vmr.

The second voltage V2 is applied between the second pixel electrode 144 and the second common electrode 152 of the second stack ST2, and a second CLC molecule 148a of the second CLC layer 148 has a homeotropic state HS where a rotation surface of a director is disposed perpendicular to surfaces of the second and third substrates 142 and 154.

The second CLC layer 148 of the homeotropic state HS transmits the red, green and blue colored light RL, GL and BL of all of circularly polarized components (a left-handed circularly polarized component and a right-handed circularly polarized component).

For example, the second voltage V2 may be equal to or greater than a minimum transmission voltage Vmt. The minimum transmission voltage Vmt may be greater than the maximum reflection voltage Vmr.

The fourth voltage V4 is applied to between the first and second mode electrodes 132 and 140 of the fourth stack ST4, and the electrochromic layer 138 is oxidized or reduced according to an opaque mode or a transparent mode to be colorized or decolorized.

As a result, the blue colored light BL of a predetermined circularly polarized component (a left-handed circularly polarized component or a right-handed circularly polarized component) among the first white colored light WL1 incident from an exterior is reflected by the third CLC layer 160 of the planar state PS, and the light of the other components including the red and green colored lights RL and GL intactly passes through the third CLC layer 160 of the planar state PS and the second and first CLC layers 148 and 126 of the homeotropic state. Accordingly, the reflective LCD device 110 emits the blue colored light BL to display a gray level corresponding to a blue color.

The reflective LCD device 110 according to an embodiment of the present disclosure displays an image by using the red, green and blue colored lights RL, GL and BL reflected by the first, second and third stacks ST1, ST2 and ST3, respectively.

The first, second and third stacks ST1, ST2 and ST3 may be driven through a time division method or may be driven simultaneously.

The reflective LCD device 110 may be driven in an opaque mode or a transparent mode by using the fourth stack ST4. These features will be illustrated with reference to drawings.

Figure 3A:
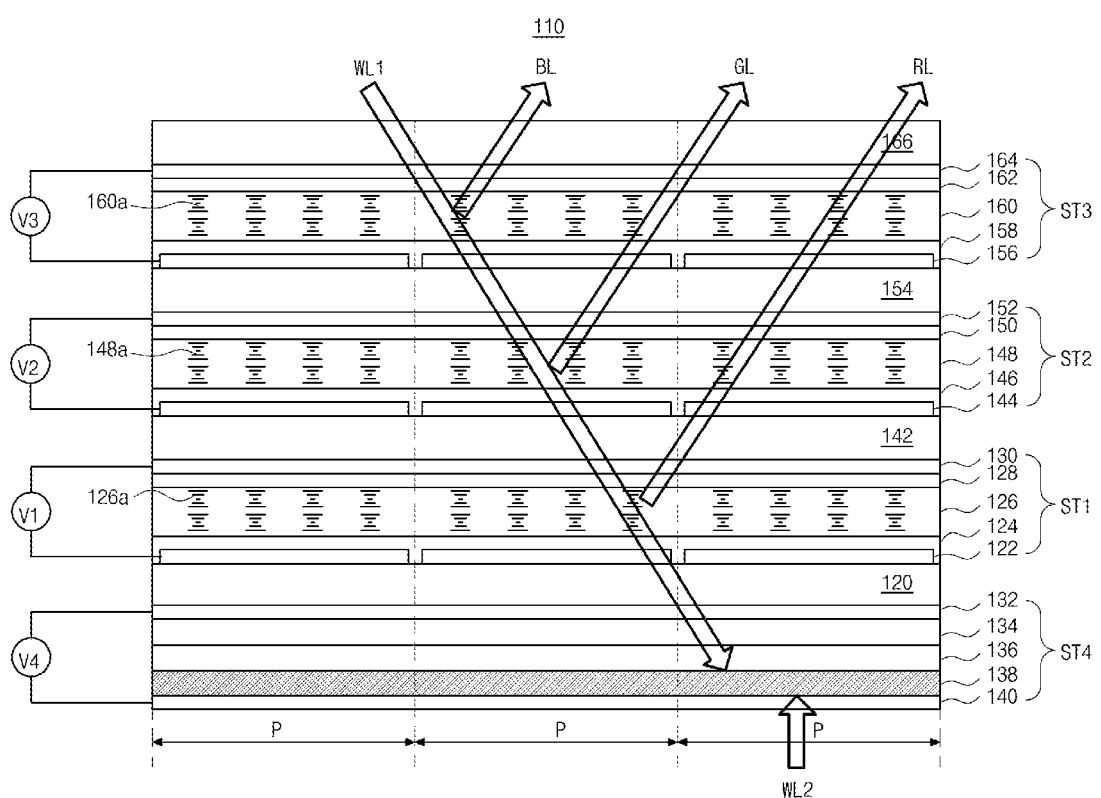
FIG. 3A is a cross-sectional view showing an opaque mode of a reflective liquid crystal display device according to an embodiment of the present disclosure.
Figure 3B:
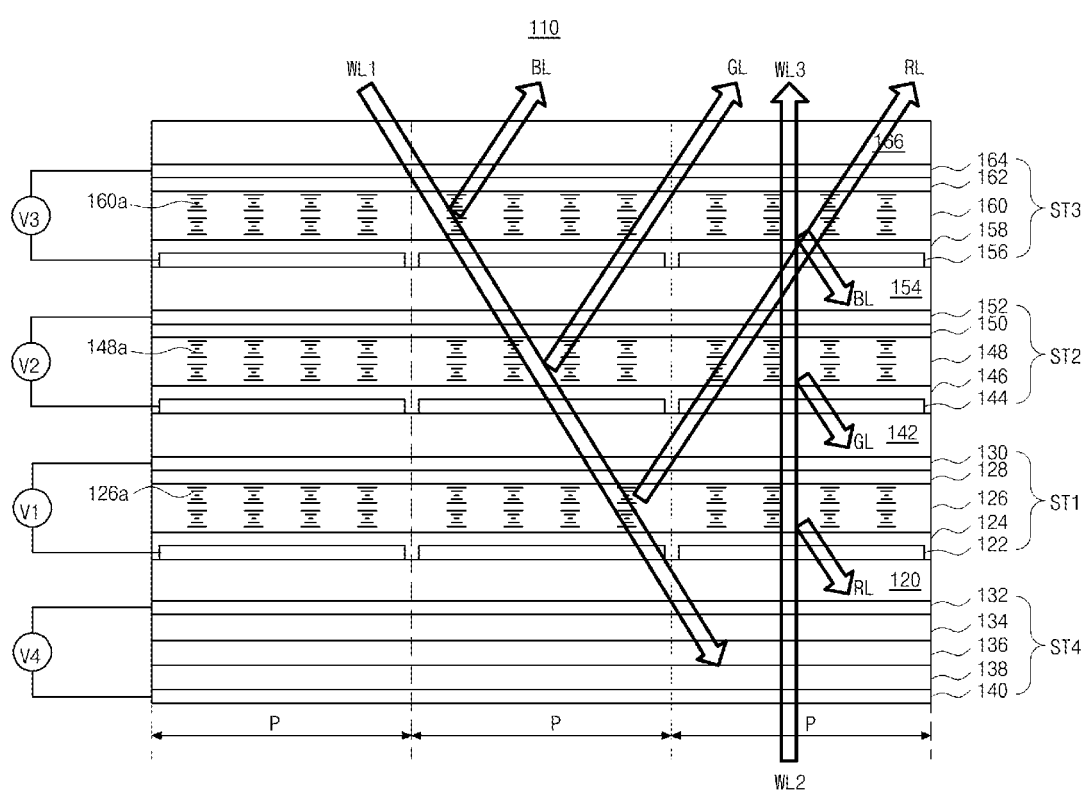
FIG. 3B is a cross-sectional view showing a transparent mode of a reflective liquid crystal display device according to an embodiment of the present disclosure.

FIGS. 3A and 3B are cross-sectional views showing an opaque mode and a transparent mode, respectively, of a reflective liquid crystal display device according to an embodiment of the present disclosure. The first, second and third stacks ST1, ST2 and ST3 may be exemplarily driven simultaneously.

In FIG. 3A, the reflective LCD device 110 according to an embodiment of the present disclosure is driven in an opaque mode. The first, second and third voltages V1, V2 and V3 are applied to the first, second and third stacks ST1, ST2 and ST3, respectively, such that each of the first, second and third CLC layers 126, 148 and 160 has the planar state PS. The fourth voltage V4 is applied to the fourth stack ST4 such that the electrochromic layer 138 is oxidized or reduced to be colorized (opaque).

As a result, the red, green and blue colored lights RL, GL and BL of a predetermined circularly polarized component (a left-handed circularly polarized component or a right-handed circularly polarized component) among the first white colored light WL1 incident to the reflective LCD device 110 from an exterior are reflected by the first, second and third CLC layers 126, 148 and 160, respectively, and the light of the other components is absorbed by the electrochromic layer 138.

For example, when the reflective LCD device 110 displays black color, the first, second and third stacks ST1, ST2 and ST3 may not reflect the red, green and blue colored lights RL, GL and BL, respectively, and the electrochromic layer 138 may absorb all of the first white colored light WL1. As a result, a contrast ratio is improved.

In addition, a second white colored light WL2 incident to a lower surface of the reflective LCD device 110 from an exterior may be absorbed by the electrochromic layer 138.

Accordingly, in the opaque mode, the reflective LCD device 110 displays an image with a background incident to the lower surface blocked.

In FIG. 3B, the reflective LCD device 110 according to an embodiment of the present disclosure is driven in a transparent mode. The first, second and third voltages V1, V2 and V3 are applied to the first, second and third stacks ST1, ST2 and ST3, respectively, such that each of the first, second and third CLC layers 126, 148 and 160 has the planar state PS. The fourth voltage V4 is applied to the fourth stack ST4 such that the electrochromic layer 138 is reduced or oxidized be decolorized (transparent).

As a result, the red, green and blue colored lights RL, GL and BL of a predetermined circularly polarized component (a left-handed circularly polarized component or a right-handed circularly polarized component) among the first white colored light WL1 incident to the reflective LCD device 110 from an exterior are reflected by the first, second and third CLC layers 126, 148 and 160, respectively, and the light of the other components intactly passes through the electrochromic layer 138.

In addition, the red, green and blue colored lights RL, GL and BL of a predetermined circularly polarized component (a left-handed circularly polarized component or a right-handed circularly polarized component) among the second white colored light WL2 incident to a lower surface of the reflective LCD device 110 from an exterior may be reflected by the first, second and third CLC layers 126, 148 and 160, respectively, and the light of the other components may intactly pass through the electrochromic layer 138 and the first, second and third CLC layers 126, 148 and 160 to be emitted as a third white light WL3 through an upper surface of the reflective LCD device 110.

Accordingly, in the transparent mode, the reflective LCD device 110 displays an image with a background incident to the lower surface.

The reflective LCD device 110 according to an embodiment of the present disclosure displays an image using an external light without a backlight unit. The reflective LCD device 110 blocks or transmits the background image using the fourth stack ST4 including the electrochromic layer 138. Accordingly, the reflective LCD device 110 may be applied to a smart window which displays an image and functions as a window.

The first to sixth alignment layers 124, 128, 146, 150, 158 and 162 of the reflective LCD device 110 may be formed through a single irradiation of an ultraviolet ray using a self-alignment monomer.

FIGS. 4A to 4F are cross-sectional views showing a method of fabricating a reflective liquid crystal display device according to an embodiment of the present disclosure.

Figure 4A:
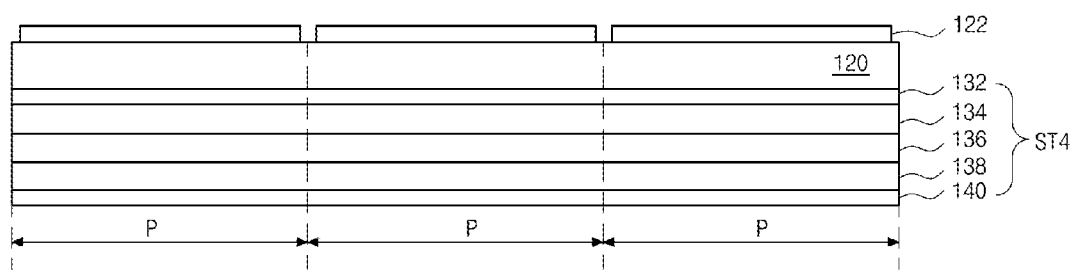
FIGS. 4A to 4F are cross-sectional views showing a method of fabricating a reflective liquid crystal display device according to an embodiment of the present disclosure.

In FIG. 4A, the first mode electrode 132, the ion storing layer 134, the electrolyte layer 136, the electrochromic layer 138, and the second mode electrode 140 are sequentially formed on the entire first surface (the lower surface) of the first substrate 120 to constitute the fourth stack ST4.

The first pixel electrode 122 is formed in each pixel P on the second surface (the upper surface) of the first substrate 120.

Figure 4B:
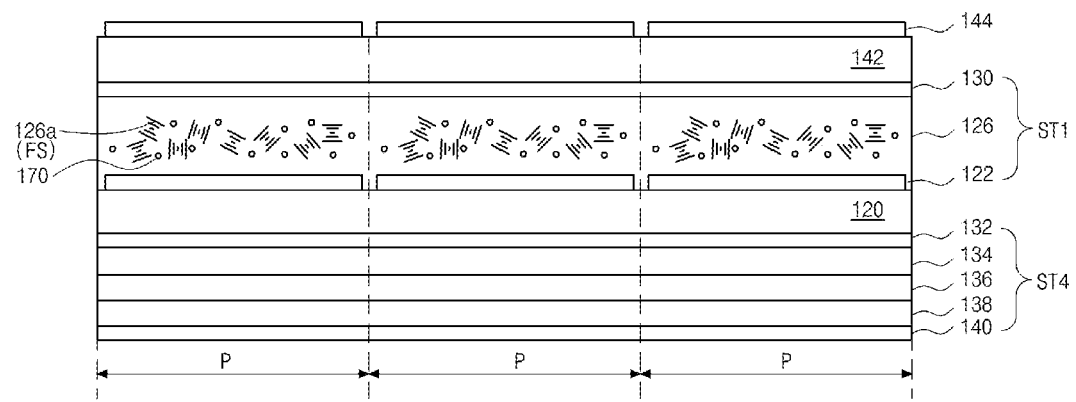

In FIG. 4B, the first common electrode 130 is formed on the entire first surface (the lower surface) of the second substrate 142, and the second pixel electrode 144 is formed in each pixel P on the second surface (the upper surface) of the second substrate 142.

Next, the first and second substrates 120 and 142 are attached, and the first CLC layer 126 is formed between the first and second substrates 120 and 142 with a mixed material of the first CLC molecule 126a and the self-alignment monomer 170 to constitute the first stack ST1.

For example, after the first and second substrates 120 and 142 are attached, the first CLC layer 126 may be formed through an injecting method. Alternatively, after the first CLC layer 126 is formed on one of the first and second substrates 120 and 142 through a dispensing method, the first and second substrates 120 and 142 may be attached.

The first CLC molecule 126a of the first CLC layer 126 has a focal conic state FS where a rotation surface of a director is randomly disposed with respect to the surfaces of the first and second substrates 120 and 142.

The self-alignment monomer 170 may include a material expressed by the following chemical formulas 1 to 4 including a cinnamate group or a chalcone group.

[Chemical Formula 1]

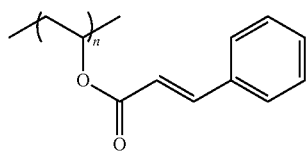

[Chemical Formula 2]

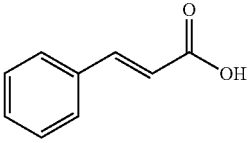

[Chemical Formula 3]

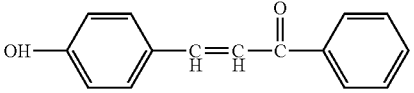

[Chemical Formula 4]

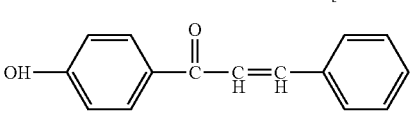

Polyvinyl-cinnamate in chemical formula 1 may be polymerized by a polarized ultraviolet ray having a wavelength of about 330 nm and an energy density of about 3 $J/cm^2$, and trans-cinnamate in chemical formula 2 may be polymerized by a polarized ultraviolet ray having a wavelength of about 330 nm and an energy density of about 4 $J/cm^2$. 4-hydroxy-chalcone in chemical formula 3 may be polymerized by a polarized ultraviolet ray having a wavelength of about 365 nm and an energy density of about 3 $J/cm^2$, and 4'-hydroxy-chalcone in chemical formula 4 may be polymerized by a polarized ultraviolet ray having a wavelength of about 365 nm and an energy density of about 4 $J/cm^2$.

Figure 4C:
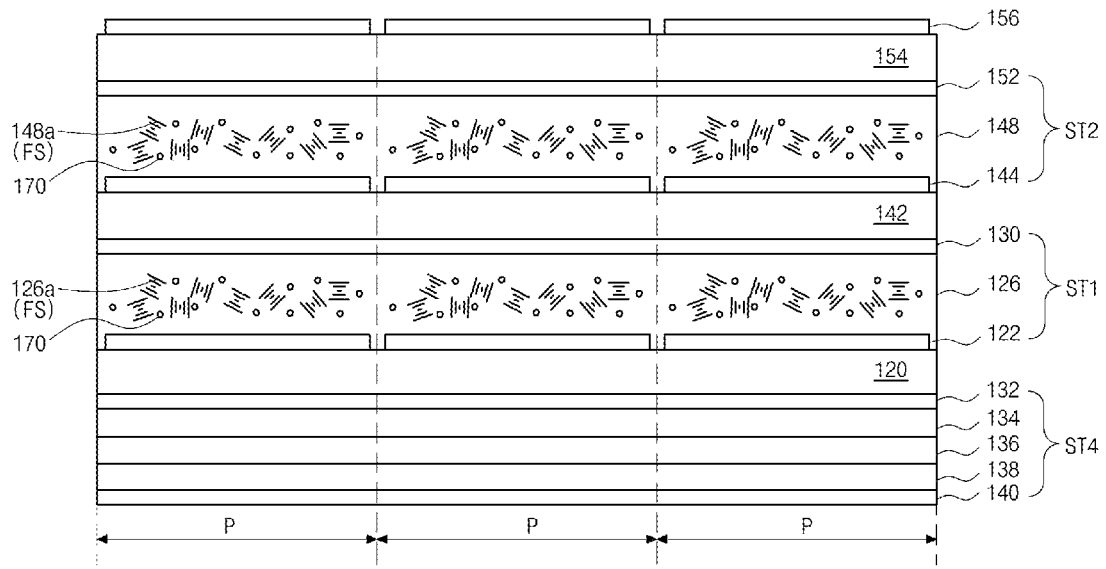

In FIG. 4C, the second common electrode 152 is formed on the entire first surface (the lower surface) of the third substrate 154, and the third pixel electrode 156 is formed in each pixel P on the second surface (the upper surface) of the third substrate 154.

Next, the second and third substrates 142 and 154 are attached, and the second CLC layer 148 is formed between the second and third substrates 142 and 154 with a mixed material of the second CLC molecule 148a and the self-alignment monomer 170 to constitute the second stack ST2.

For example, after the second and third substrates 142 and 154 are attached, the second CLC layer 148 may be formed through an injecting method. Alternatively, after the second CLC layer 148 is formed on one of the second and third substrates 142 and 154 through a dispensing method, the second and third substrates 142 and 154 may be attached.

Since a repetition pitch of the CLC molecule is proportional to a wavelength of the reflected light, the repetition pitch of the second CLC molecule 148a of the second CLC layer 148 reflecting the green colored light GL is smaller than the repetition pitch of the first CLC molecule 126a of the first CLC layer 126 reflecting the red colored light RL, and the second CLC molecule 148a of the second CLC layer 148 has the focal conic state FS where a rotation surface of a director is randomly disposed with respect to surfaces of the second and third substrates 142 and 154.

The self-alignment monomer 170 of the second CLC layer 148 may be the same as the self-alignment monomer 170 of the first CLC layer 126.

Figure 4D:
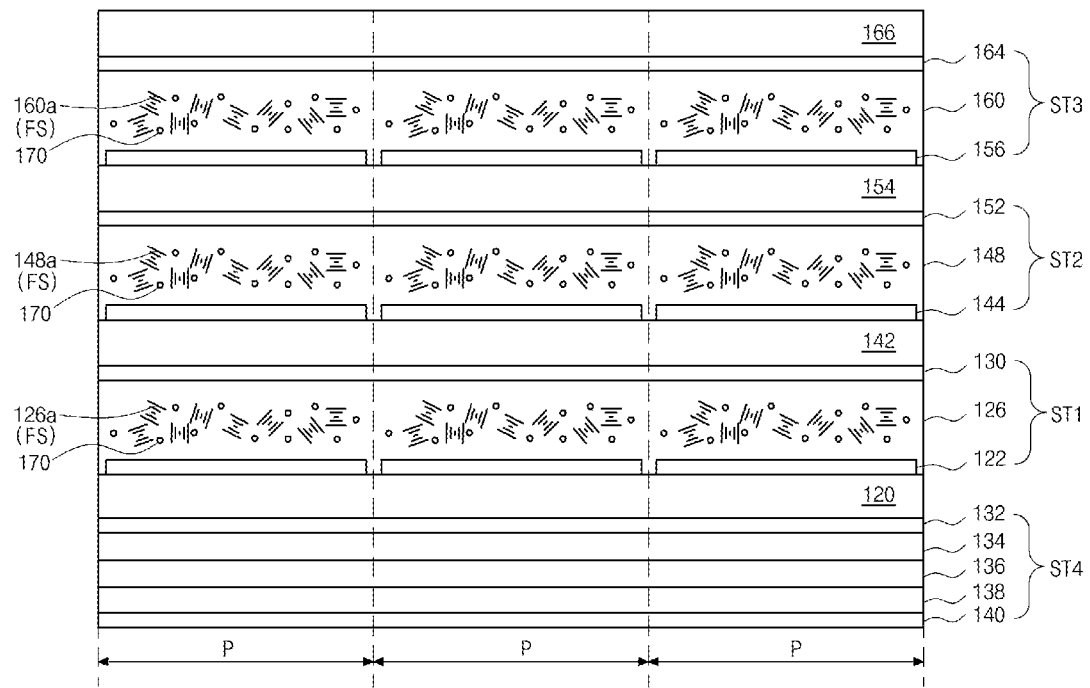

In FIG. 4D, the third common electrode 164 is formed on the entire first surface (the lower surface) of the fourth substrate 166.

Next, the third and fourth substrates 154 and 166 are attached, and the third CLC layer 160 is formed between the third and fourth substrates 154 and 166 with a mixed material of the third CLC molecule 160a and the self-alignment monomer 170 to constitute the third stack ST3.

For example, after the third and fourth substrates 154 and 166 are attached, the third CLC layer 160 may be formed through an injecting method. Alternatively, after the third CLC layer 160 is formed on one of the third and fourth substrates 154 and 166 through a dispensing method, the third and fourth substrates 154 and 166 may be attached.

The repetition pitch of the third CLC molecule 160a of the third CLC layer 160 reflecting the blue colored light BL is smaller than the repetition pitch of the second CLC molecule 148a of the second CLC layer 148 reflecting the green colored light GL, and the third CLC molecule 160a of the third CLC layer 160 has the focal conic state FS where a rotation surface of a director is randomly disposed with respect to surfaces of the third and fourth substrates 154 and 166.

The self-alignment monomer 170 of the third CLC layer 160 may be the same as the self-alignment monomer 170 of the first and second CLC layers 126 and 148.

Figure 4E:
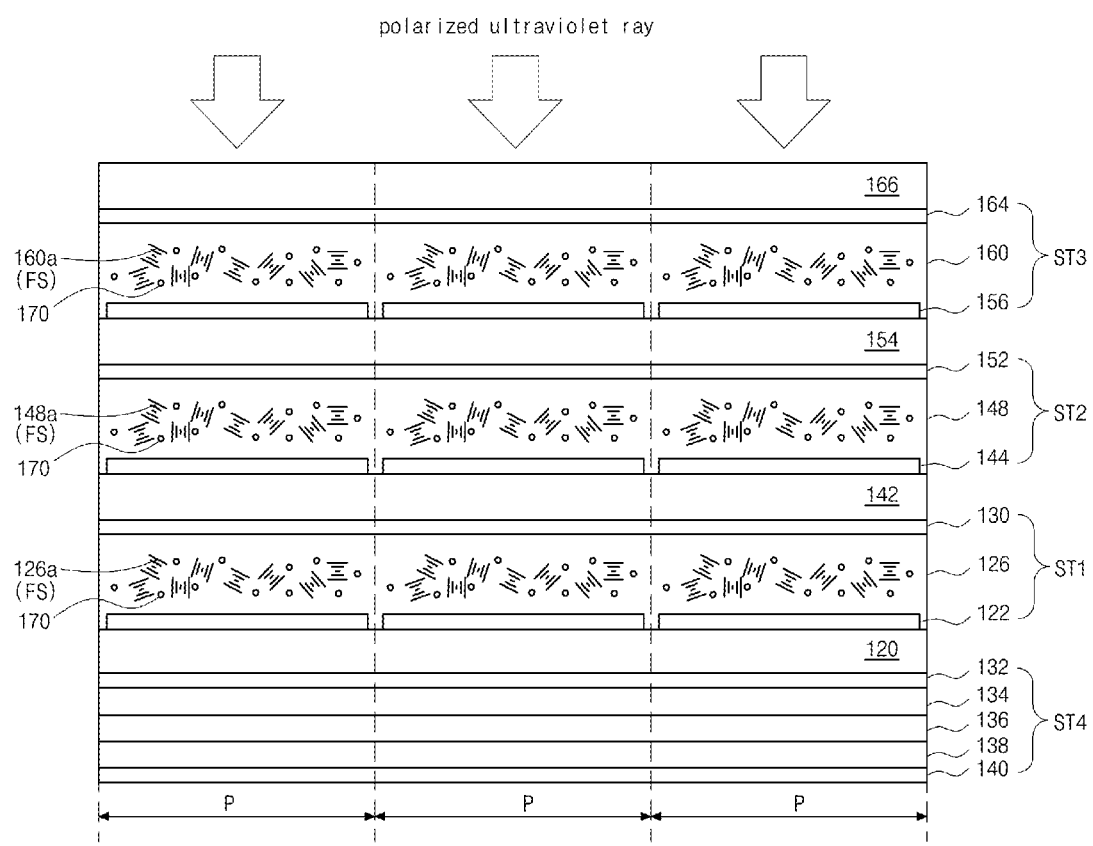

In FIG. 4E, a linearly polarized ultraviolet ray is irradiated onto the first, second and third CLC layers 126, 148 and 160 through the fourth substrate 166 of the attached first, second, third and fourth substrates 120, 142, 154 and 166 one time. The self-alignment monomer 170 of the first, second and third CLC layers 126, 148 and 160 is polymerized by a single irradiation of the polarized ultraviolet ray.

Since the fourth stack ST4 is formed on the first surface (the lower surface) of the first substrate 120, the polarized ultraviolet ray may be irradiated onto the first, second and third CLC layers 126, 148 and 160 through the fourth substrate 166.

Figure 4F:
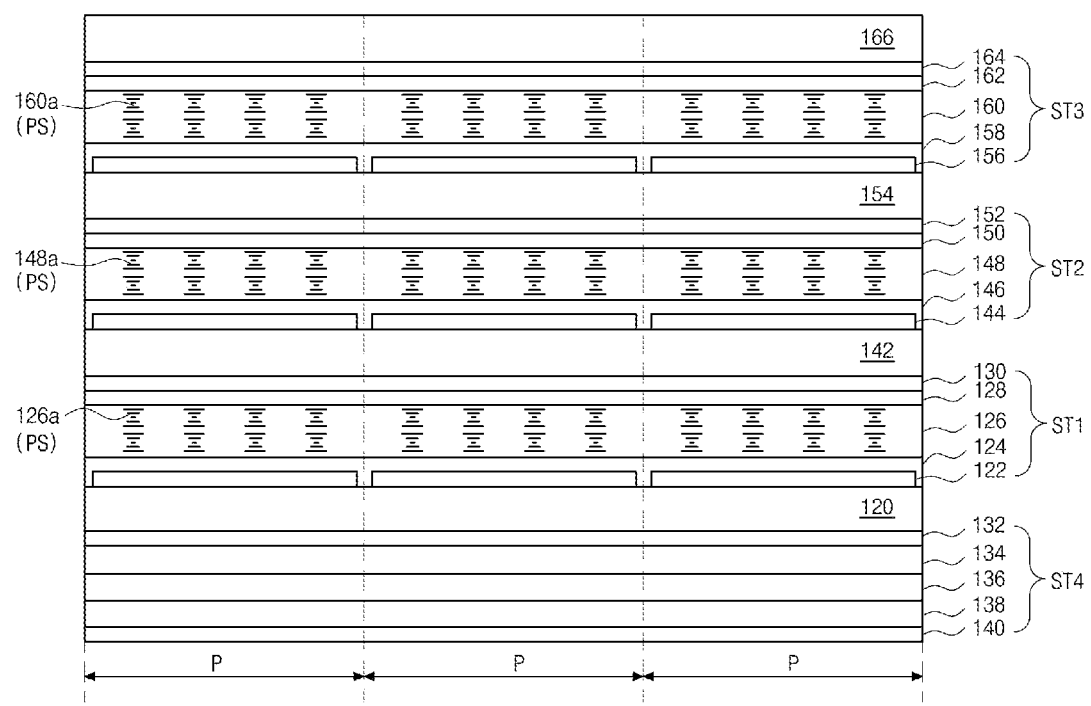

In FIG. 4F, due to polymerization of the self-alignment monomer 170 according to a single irradiation of the polarized ultraviolet ray, the first alignment layer 124 is formed between the first substrate 120 and the first CLC layer 126, the second alignment layer 142 is formed between the second substrate 142 and the first CLC layer 126, the third alignment layer 146 is formed between the second substrate 142 and the second CLC layer 148, the fourth alignment layer 150 is formed between the third substrate 154 and the second CLC layer 148, the fifth alignment layer 158 is formed between the third substrate 154 and the third CLC layer 160, and the sixth alignment layer 162 is formed between the fourth substrate 166 and the third CLC layer 160.

The first CLC layer 126 has the planar state PS where a rotation surface of a director is disposed parallel to surfaces of the first and second substrates 120 and 142 due to an initial alignment direction by the first and second alignment layers 124 and 128. The second CLC layer 148 has the planar state PS where a rotation surface of a director is disposed parallel to surfaces of the second and third substrates 142 and 154 due to an initial alignment direction by the third and fourth alignment layers 146 and 150. The third CLC layer 160 has the planar state PS where a rotation surface of a director is disposed parallel to surfaces of the third and fourth substrates 154 and 166 due to an initial alignment direction by the fifth and sixth alignment layers 158 and 162.

In the method of fabricating the reflective LCD device 110 according to an embodiment of the present disclosure, since the first, second, third, fourth, fifth and sixth alignment layers 124, 128, 146, 150, 158 and 162 are formed by the single irradiation of the polarized ultraviolet ray, the fabrication process is simplified and the fabrication time and the fabrication cost are reduced.

After the first, second, third and fourth substrates 120, 142, 154 and 166 are attached, the first, second, third, fourth, fifth and sixth alignment layers 124, 128, 146, 150, 158 and 162 are formed by the single irradiation of the polarized ultraviolet ray. As a result, the optical axes of the first, second and third CLC layers 126, 148 and 160 are aligned with each other, and a contrast ratio and a color purity are improved. In addition, since an error of an alignment direction due to misalignment of the attachment is reduced, generation of a twist angle is prevented and a driving voltage is reduced.

For example, the first, second and third stacks ST1, ST2 and ST3 may be driven with a voltage smaller than about 20 V.

Further, the first, second, third, fourth, fifth and sixth alignment layers 124, 128, 146, 150, 158 and 162 are formed by the single irradiation of the polarized ultraviolet ray, and the first, second and third CLC layers 126, 148 and 160 are aligned by the single irradiation of the polarized ultraviolet ray to have the planar state PS. As a result, the first, second and third CLC layers 126, 148 and 160 are sufficiently aligned even with first, second, third, fourth, fifth and sixth alignment layers 124, 128, 146, 150, 158 and 162 each having a relatively small thickness. Accordingly, a transmittance of the first, second and third CLC layers 126, 148 and 160 increases and a scattering of the first, second and third CLC layers 126, 148 and 160 decreases.

For example, each of the first, second, third, fourth, fifth and sixth alignment layers 124, 128, 146, 150, 158 and 162 may have a thickness of about 20 nm.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a reflective liquid crystal display device, comprising:
    forming a first mode electrode, an ion storing layer, an electrolyte layer, an electrochromic layer, and a second mode electrode sequentially on an entire lower surface of a first substrate;
    forming a first pixel electrode in each of a plurality of pixels on an upper surface of the first substrate;
    forming a first common electrode on an entire lower surface of a second substrate;
    forming a second pixel electrode in each of the plurality of pixels on an upper surface of the second substrate;
    forming a first cholesteric liquid crystal layer between the first and second substrates with a mixed material of a first cholesteric liquid crystal molecule and a self-alignment monomer;
    forming a second common electrode on an entire lower surface of a third substrate;
    forming a third pixel electrode in each of the plurality of pixels on an upper surface of the third substrate;
    forming a second cholesteric liquid crystal layer between the second and third substrates with a mixed material of a second cholesteric liquid crystal molecule and the self-alignment monomer;
    forming a third common electrode on an entire lower surface of a fourth substrate;
    forming a third cholesteric liquid crystal layer between the third and fourth substrates with a mixed material of a third cholesteric liquid crystal molecule and the self-alignment monomer; and forming a first alignment layer between the first substrate and the first cholesteric liquid crystal layer, a second alignment layer between the second substrate and the first cholesteric liquid crystal layer, a third alignment layer between the second substrate and the second cholesteric liquid crystal layer, a fourth alignment layer between the third substrate and the second cholesteric liquid crystal layer, a fifth alignment layer between the third substrate and the third cholesteric liquid crystal layer, and a sixth alignment layer between the fourth substrate and the third cholesteric liquid crystal layer by irradiating a polarized ultraviolet ray onto the first, second and third cholesteric liquid crystal layers.

2. The method of claim 1, further comprising attaching the first, second, third and fourth substrates before the polarized ultraviolet ray is irradiated.

3. The method of claim 1, wherein the first, second, third, fourth, fifth and sixth alignment layers are formed by polymerization of the self-alignment monomer due to the polarized ultraviolet ray.

4. The method of claim 1, wherein the first cholesteric liquid crystal layer has a planar state due to the first and second alignment layers such that a rotation surface of a director is disposed parallel to surfaces of the first and second substrate, wherein the second cholesteric liquid crystal layer has a planar state due to the third and fourth alignment layers such that a rotation surface of a director is disposed parallel to surfaces of the second and third substrate, and wherein the third cholesteric liquid crystal layer has a planar state due to the fifth and sixth alignment layers such that a rotation surface of a director is disposed parallel to surfaces of the third and fourth substrate.

5. The method of claim 1, wherein a repetition pitch of the second cholesteric liquid crystal molecule is smaller than a repetition pitch of the first cholesteric liquid crystal molecule and greater than a repetition pitch of the third cholesteric liquid crystal molecule.

6. A method of fabricating a reflective liquid crystal display device, comprising:

providing first, second, third and fourth substrates spaced apart from and parallel to each other;

forming a first cholesteric liquid crystal layer between the first and second substrates with a mixed material of a first cholesteric liquid crystal molecule and a self-alignment monomer;

forming a second cholesteric liquid crystal layer between the second and third substrates with a mixed material of a second cholesteric liquid crystal molecule and the self-alignment monomer;

forming a third cholesteric liquid crystal layer between the third and fourth substrates with a mixed material of a third cholesteric liquid crystal molecule and the self-alignment monomer; and forming a first alignment layer between the first substrate and the first cholesteric liquid crystal layer, a second alignment layer between the second substrate and the first cholesteric liquid crystal layer, a third alignment layer between the second substrate and the second cholesteric liquid crystal layer, a fourth alignment layer between the third substrate and the second cholesteric liquid crystal layer, a fifth alignment layer between the third substrate and the third cholesteric liquid crystal layer and a sixth alignment layer between the fourth substrate and the third cholesteric liquid crystal layer by irradiating a polarized ultraviolet ray onto the first, second and third cholesteric liquid crystal layers.

7. The method of claim 6, further comprising:

sequentially forming a first mode electrode, an ion storing layer, an electrolyte layer, an electrochromic layer and a second mode electrode on a whole of a lower surface of the first substrate and forming a first pixel electrode in each of a plurality of pixels on an upper surface of the first substrate;

forming a first common electrode on a whole of a lower surface of the second substrate and forming a second pixel electrode in each of the plurality of pixels on an upper surface of the second substrate;

forming a second common electrode on a whole of a lower surface of the third substrate and forming a third pixel electrode in each of the plurality of pixels on an upper surface of the third substrate; and forming a third common electrode on a whole of a lower surface of the fourth substrate.

\* \* \* \* \*